United States Patent
Kawamura et al.

(10) Patent No.: US 6,530,695 B2
(45) Date of Patent: Mar. 11, 2003

(54) ROLLING BEARING AND METHOD OF MAKING THE SAME

(75) Inventors: Hisashi Kawamura, Kanagawa (JP); Yukio Ohura, Kanagawa (JP); Manabu Ohori, Kanagawa (JP); Susumu Tanaka, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/864,455

(22) Filed: May 25, 2001

(65) Prior Publication Data

US 2001/0048781 A1 Dec. 6, 2001

(30) Foreign Application Priority Data

May 26, 2000 (JP) ........................................ 2000-156013

(51) Int. Cl.[7] .............................................. F16C 33/62
(52) U.S. Cl. .................... 384/492; 384/625; 384/907.1
(58) Field of Search ............................. 384/492, 625, 384/907.1

(56) References Cited

U.S. PATENT DOCUMENTS 5,165,804 A  * 11/1992 Fisher et al. ................ 384/492
5,228,786 A  *  7/1993 Tanimoto et al. ........... 384/492
6,290,398 B1 *  9/2001 Fujiwara et al. ............ 384/492

FOREIGN PATENT DOCUMENTS

| EP | 0 971 141 A1 | 1/2000 | ............ F16C/33/62 |
| JP | 8-9766 | 1/1996 | ............. C23C/8/26 |
| JP | 10-131970 | 5/1998 | ............ F16C/33/58 |
| JP | 11-80923 | 3/1999 | ............. C23C/8/26 |
| WO | WO98/44270 | 10/1998 | ............ F16C/33/32 |

* cited by examiner

Primary Examiner—Thomas R. Hannon
(74) Attorney, Agent, or Firm—Sughrue Mion, PLLC

(57) ABSTRACT

A fine nitride layer comprising a compound layer and a diffusion hardened layer of hardness being Hv900 or higher is formed, through a low temperature nitriding method at temperature in the range of 300 to 400° C., in a guiding part. The guiding part guides the circumferential surfaces of retainers 7a to 7c and is formed at any one part of inner ring raceways 3a to 3c and outer ring raceways 4a to 4c as well as the inner circumferential surfaces of the outer rings 5a to 5c, to thereby realize such rolling bearings at low cost, having excellent abrasion resistance, and good corrosion resistance, if needed.

9 Claims, 4 Drawing Sheets

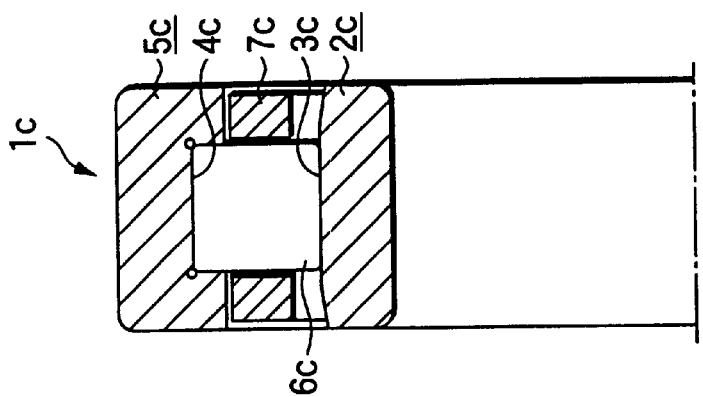
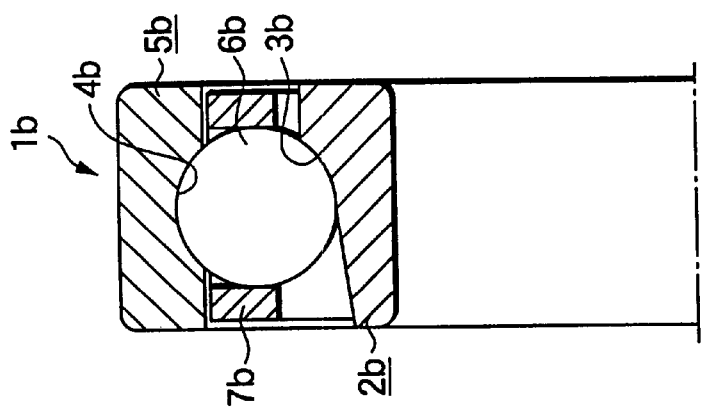
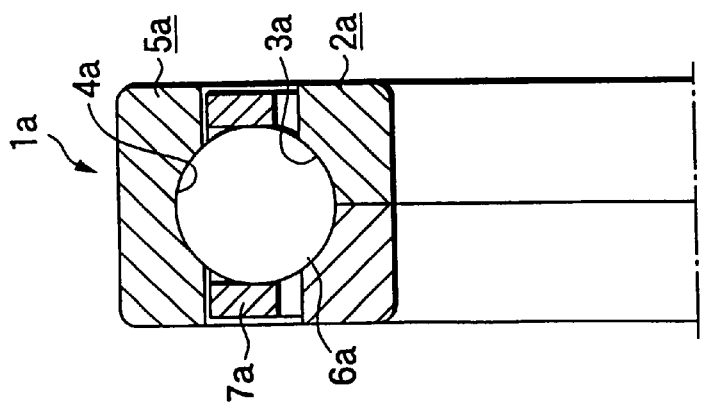

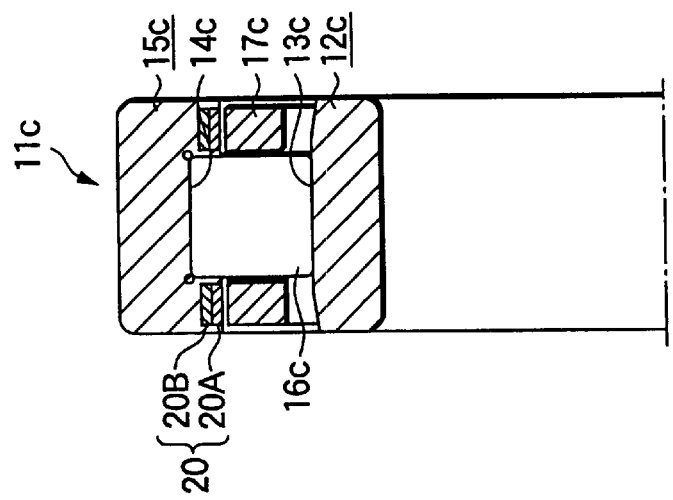
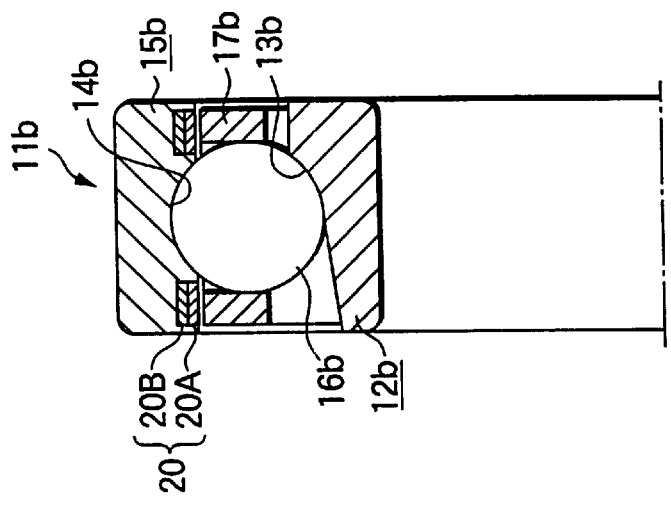
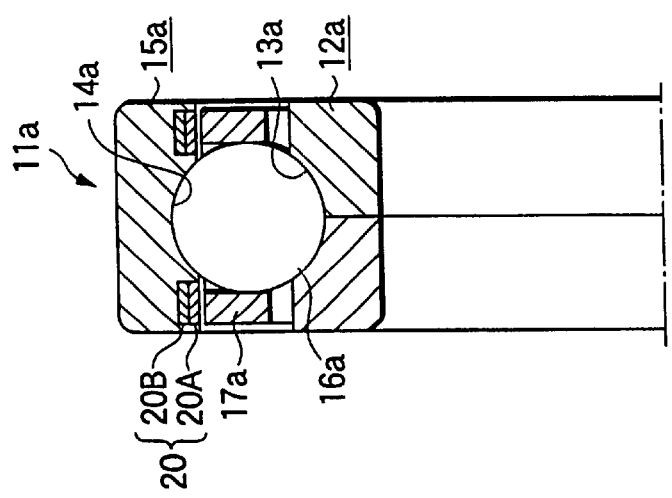

ROLLING BEARING AND METHOD OF MAKING THE SAME

BACKGROUND OF THE INVENTION

The present invention is to improve abrasion resistance of rolling bearings to be incorporated in rotation supporters of jet engines for aircraft or gear boxes and to be served under circumstance at high temperatures, thereby to heighten endurance of rolling bearings.

In rotation supporters of jet engines for aircraft or gear boxes, rolling bearings 1a to 1c as shown in FIGS. 1A to 1C are incorporated as bearings for aircraft. Three kinds of rolling bearings 1a to 1c are shown in FIGS. 1A to 1C. The rolling bearing 1a of FIG. 1A is a ball bearing of single row deep groove type with four point-contact points in which two-piece housing inner ring 2a is provided. The rolling bearing 1b of FIG. 1B is an angular ball bearing having an inner ring 2b of counter bored type. The bearing of FIG. 1C is a single row cylindrical roller bearing.

In each of these cases, the rolling bearings 1a to 1c have inner rings 2a to 2c, outer rings 5a to 5c, a plurality rolling elements 6a to 6c rotatably disposed therebetween, and retainers 7a to 7c, respectively. The inner rings 2a to 2c are made of iron based alloy and respectively have inner ring raceways 3a to 3c in outer circumferential surfaces thereof. The outer rings 5a to 5c are made of iron-alloy and respectively have outer ring raceways 4a to 4c in inner circumferential surfaces thereof. The plurality rolling elements 6a to 6c are rotatably disposed between the inner ring raceways 3a to 3c and the outer ring raceways 4a to 4c, respectively. The retainers 7a to 7c rotatably hold the rolling elements 6a to 6c, respectively. The outer circumferential surface of each of the retainers 7a to 7c is prevented from displacement in an radial direction thereof by guiding the outer circumferential surface of respective retainer 7a to 7c by means of one part of the inner circumferential surface of the outer ring 5a to 5c which (one part) is disposed outside of the outer ring raceway 4a to 4c.

For using the rolling bearings 1a to 1c of the structures as shown in FIGS. 1A to 1C in applications particularly requiring large corrosion resistance in bearings for aircraft, there are many cases manufacturing the inner rings 2a to 2c and the outer rings 5a to 5c with SUS440C (the iron-alloy containing C 1.05 wt %, P 0.040 wt % or lower, S 0.030 wt % or lower, Mn 1.00 wt %, Si 1.00 wt %, Cr 17.00 wt %, Mo 0.75 wt %, the balance being Fe and unavoidable impurities).

Using SUS440C under circumstances at high temperatures as jet engine for aircraft or gear boxes, it did not always have enough corrosion resistance and so was disadvantageous in view of securing endurance. That is, since the inner rings 2a to 2c and outer rings 5a to 5c constituting the rolling bearings 1a to 1c to be applied to usage as above mentioned are tempered at high temperatures in the course of the production, the hardness in the surfaces including the inner ring raceways 3a to 3c and the outer ring raceways 4a to 4c is around Hv650 at the most. This value is poor in the corrosion resistance comparing with the hardness Hv being about 700 of heat resistant bearing steels such as M50 (the iron-alloy containing C: 0.80 wt %, P: 0.030 wt % or lower, S: 0.030 wt % or lower, Mn: 0.30 wt %, Si: 0.25 wt %, Cr: 4.00 wt %, V: 1.00 wt %, Mo: 4.25 wt %, the balance being Fe and unavoidable impurities). On the other hand, the heat resistant bearing steels as M50 are difficult to secure a sufficient endurance in term of corrosion resistance.

In view of such circumstances, there are cases of using heat resistant and corrosion resistant steels such as Pyrowear 675 (trade name=iron-alloy containing C: 0.07 wt %, P: 0.005 wt % or lower, S: 0.003 wt % or lower, Mn: 0.65 wt %, Si: 0.40 wt %, Cr: 13.00 wt %, V: 0.60 wt %, Mo: 1.80 wt %, Ni: 2.60 wt %, Co: 5.40 wt %, the balance being Fe and unavoidable impurities). However, if fabricating the inner rings 2a to 2c and the outer rings 5a to 5c of the rolling bearings 1a to 1c with such heat resistant and corrosion resistant steels, being accompanied with carburizing treatments for hardening surfaces, Cr carbides are precipitated in the surfaces of the inner rings 2a to 2c and the outer rings 5a to 5c, so that the corrosion resistance in the surface is lowered and it is still difficult to secure the enough endurance.

Further, in case of using the rolling bearings 1a to 1c as shown in FIGS. 1A to 1C for supporting such as turbines of jet engines for aircraft, parts guiding the outer circumferential surfaces of the retainers 7a to 7c often causes abrasion or damage in parts of the inner circumferential surfaces of the outer rings 5a to 5c. For avoiding such accidents, the conventional technique carries out a treatment for forming a hard film such as TiN in the guiding part of the outer circumferential surfaces. But since this hard film treatment is very expensive, and not only it invites cost-up of the rolling bearings 1a to 1c, but also the hard film often comes off, it does not always bring about an effect of improving a secure abrasion resistibility.

Besides, with respect to the rolling bearings 1a to 1c to be used to jet engines for aircraft or gear boxes, in a case of a so-called hybrid bearing where the inner rings 2a to 2c as well as the outer rings 5a to 5c are made of bearing steels, but the rolling elements are made of ceramic in order to heighten a seizure resistance, the improvement of the abrasion resistibility in the inner rings 2a to 2c and the outer rings 5a to 5c become a furthermore problem. That is, in the hybrid bearing, since the contacting condition between the inner rings 2a to 2c and the rolling elements 6a to 6c and/or the contacting condition between the outer rings 5a to 5c and the rolling elements 6a to 6c takes place between materials of heterogeneous kinds, the seizure resistance of the rolling elements 6a to 6c can be improved in comparison with the bearing having the rolling elements made of bearing steels (as well as the inner and outer rings). However, the hardness of the bearing steel comprising the inner rings 2a to 2c and the outer rings 5a to 5c is far lower than that of the ceramic composing the rolling elements 6a to 6c, so that when foreign matters as dust or dirt go into the bearings 1a to 1c, the inner raceways 3a to 3c and the outer raceways 4a to 4c are considerably worn.

SUMMARY OF THE INVENTION

In view of these situations, the invention has been made to realize such rolling bearings at low cost, having excellent abrasion resistance, and good corrosion resistance, if needed.

In addition, the invention has also been made to realize a method of making such rolling bearings.

The above-mentioned object can be achieved by a rolling bearing according to a first aspect of the invention comprising an inner ring, an outer ring, a plurality of rolling elements rotatably disposed therebetween, and a retainer. The inner ring is made of iron-alloy and has an inner ring raceway in an outer circumferential surface thereof. The outer ring is made of iron-alloy and has an outer ring raceway in an inner circumferential surface thereof. The plurality of rolling elements are rotatably disposed between the inner ring raceway and the outer ring raceway. The retainer has the inner circumferential surface and the outer circumferential surface and rotatably holds each of the rolling elements. Either of the inner and outer circumferential surfaces of the retainer is guided by a part of either of the outer circumferential surface of the inner ring and the inner circumferential surface of the outer ring for preventing the displacement in the radial direction of the retainer.

In the rolling bearing of the invention, a fine nitride layer comprising a compound layer and a diffusion hardened layer and has hardness of Hv900 or higher is formed in a part which guides the circumferential surface of a retainer by means of at least one part of any surface of the inner ring raceway surface and the outer ring raceway surface as well as the outer circumferential surface of the inner ring and the inner circumferential surface of the outer ring.

The above-mentioned object can also be achieved by a method of making the above-mentioned rolling bearing, according to a second aspect of the present invention, comprising the steps of:

performing a low-temperature nitriding treatment at 300 to 400° C. so as to form nitride layer in surfaces of the inner ring and the outer ring of the rolling bearing.

As the low-temperature nitriding treatment, an NV nitriding treatment being "NV-300" of Daido Hokusan K.K. may be desirably used.

BRIEF DESCRIPTION OF THE DRAWINGS

FIGS. 1A, 1B, and 1C show partially cross sectional views illustrating three examples of the conventional rolling bearings;

FIGS. 2A, 2B, and 2C show partially cross sectional views illustrating three examples of the rolling bearings according to the present invention;

DETAILED DESCRIPTION OF THE PREFERRED EMBODIMENTS

Figure 3:
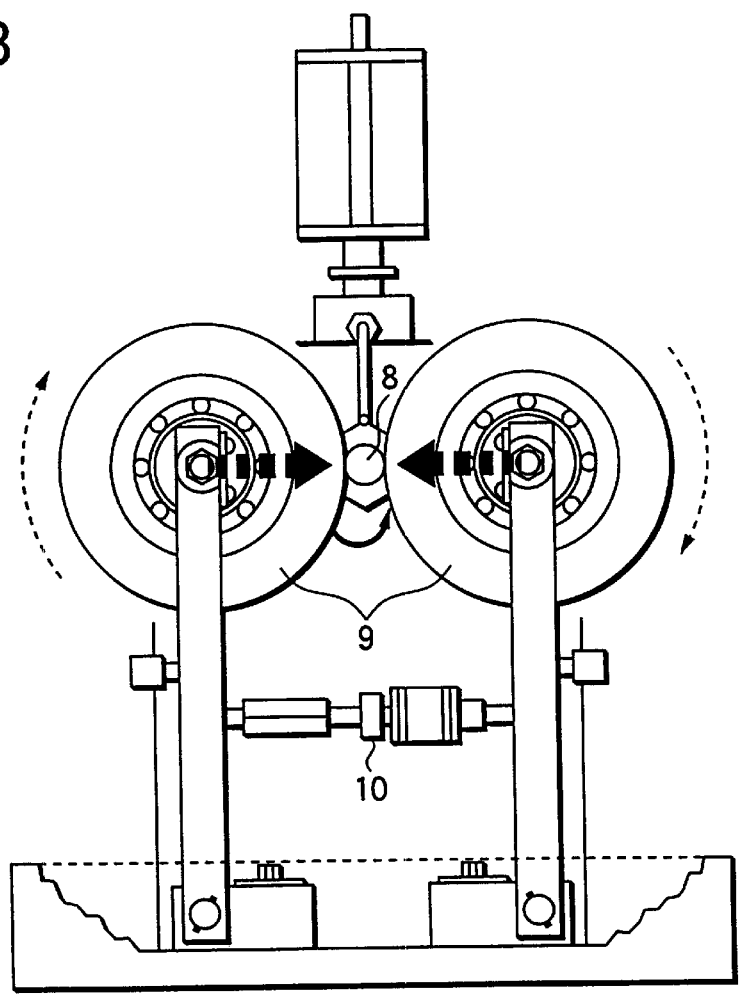
FIG. 3 shows a front view of the testing apparatus used for confirming effects brought about by the invention.

Hereinafter, first to three embodiments of the rolling bearing according to the present invention will be described.

In rotation supporters of jet engines for aircraft or gear boxes, rolling bearings 11a to 11c as shown in FIGS. 2A to 2C are incorporated as bearings for aircraft. Three kinds of rolling bearings 11a to 11c according to first to third embodiments according to the present invention are shown in FIGS. 2A to 2C. The rolling bearing 11a of FIG. 2A according to the first embodiment is a ball bearing of single row deep groove type with four point-contact points in which two-piece housing inner ring 12a is provided. The rolling bearing 11b of FIG. 2B according to the second embodiment is an angular ball bearing having an inner ring 12b of counter bored type. The bearing of FIG. 2C according to the third embodiment is a single row cylindrical roller bearing.

In each of these cases, the rolling bearings 11a to 11c have inner rings 12a to 12c, outer rings 15a to 15c, a plurality rolling elements 16a to 16c rotatably disposed therebetween, and retainers 17a to 17c, respectively. The inner rings 12a to 12c are made of iron based alloy and respectively have inner ring raceways 13a to 13c in outer circumferential surfaces thereof. The outer rings 15a to 15c are made of iron-alloy and respectively have outer ring raceways 14a to 14c in inner circumferential surfaces thereof. The plurality rolling elements 16a to 16c are made of ceramic and are rotatably disposed between the inner ring raceways 13a to 13c and the outer ring raceways 14a to 14c, respectively. The retainers 17a to 17c rotatably hold the rolling elements 16a to 16c, respectively. The outer circumferential surface of each of the retainers 17a to 17c is prevented from displacement in an radial direction thereof by guiding the outer circumferential surface of respective retainer 17a to 17c by means of one part of the inner circumferential surface of the outer ring 15a to 15c which (one part) is disposed outside of the outer ring raceway 14a to 14c.

However, it is also possible to guide the inner circumferential surface of the retainer with the outer circumferential surface of the inner ring so as to prevent the displacement of the retainer in the radial direction.

In each of the rolling bearings 11a to 11c of the invention, a fine nitride layer 20 is formed in a part which guides the outer circumferential surface of each of the retainer 17a to 17c. The fine nitride layer 20 is provided on at least one part of the inner circumferential surface of each of the outer rings 15a to 15c.

However, note that when the retainers 17a to 17c are guided by the outer circumferential surface of the inner rings 15a to 15c respectively, it is possible to provide such fine nitride layer 20 on at least part of outer circumferential surface of each of the inner rings 15a to 15c. Further, the fine nitride layer 20 may be provided on both of the inner and outer circumferential surfaces of the inner and outer rings.

The fine nitride layer 20 comprises a compound layer 20A as a surface layer and a diffusion hardened layer 20B disposed below the compound layer 20A. The fine nitride layer 20 has hardness of Hv900 or higher.

The fine nitride layer 20 is formed by a low-temperature nitriding treatment performed at 300 to 400° C. As the low-temperature nitriding treatment, an NV nitriding treatment being "NV-300" of Daido Hokusan K.K. may be desirably used.

In case the iron based alloy such as stainless steels is carried out with the low temperature nitriding at 300 to 400° C., not the carburizing treatment, a secondary hardening does not take place, and the nitrogen goes into the metallic structure, so that the hardness in the surfaces of the inner rings 12a to 12c and the outer rings 15a to 15c fabricated with the above iron-alloy is heightened. Thus, the abrasion resistance in the inner rings 12a to 12c and the outer rings 15a to 15c is increased in that the hardness in the surface is heightened. Besides, the surfaces of the inner rings 12a to 12c and the outer rings 15a to 15c are not effected with the secondary hardening, and since CrN is not precipitated in the surfaces, the corrosion resistance does not go down. Accordingly, if a material having an excellent corrosion resistance is used as the iron-alloy, the corrosion resistance can be enough secured in the inner rings 12a to 12c and the outer rings 15a to 15c.

On the other hand, depending on an ordinary gas nitriding treatment which has conventionally been used to hardening of surfaces of the iron-alloys, since the treating temperature is high as 480 to 600° C., not only the surfaces of the inner rings 12a to 12c and the outer rings 15a to 15c are effected with the secondary hardening, but also CrN is precipitated in the surfaces. Those undesirably worsen the corrosion resistance in the surface of the iron-alloy.

If performing the low temperature nitriding treatment on the above M50 or M50NiL (iron based alloys containing C 0.13 wt %, P 0.030 wt % or lower, S 0.030 wt % or lower, Mn 0.30 wt %, Si 0.25 wt %, Cr 4.00 wt %, V 1.20 wt %, Mo 4.25 wt %, Ni 3.50 wt %, the balance being Fe and unavoidable impurities), a residual compresive stress is increased and both of fracture toughness and rolling fatigue life are heightened. In particular, as the surface hardening is increased, the rolling fatigue life when foreigners are mixed is remarkably improved.

EXAMPLES

Reference will be made to experiments for confirming effects brought about by the invention. The experiments were practiced using a testing apparatus (Polymet testing apparatus) as shown in FIG. 3. This testing apparatus presses loading disks 9, 9 against a pillar-like testing piece 8 rotated by a motor (not shown) by a loading apparatus 10, said loading disks 9,9 being located at two positions in opposite sides in the diameter direction of the testing piece 8. The rolling contacts between the outer circumferential surface of the test piece 8 and the outer circumferential surfaces of the loading disks 9,9 are dropped with a lubricant oil (compound gas turbine oil) of a fixed amount from an oil supply apparatus to provide lubrication on the rolling contacts.

The diameter of the test piece 8 was 9.5 mm, the length was 76 mm, the rotation speed was 12500 $min^{-1}$, and the contacting pressure at the rolling contacts was 4.8 Gpa. The parameter Λ value) of oil pressure was 0.9. The test pieces 8 of M50 and M50NiL were many prepared for testing under these condition, and with respect to each kind of the test pieces, those practiced with the low temperature nitriding treatment and those not practiced therewith were produced. The tests were continued until peeling appeared on the surfaces per each kind of the test pieces, and total rotation numbers until peeling (the number of repeating stress) were recorded. The results are shown in FIGS. 4 and 5.

Figure 4:
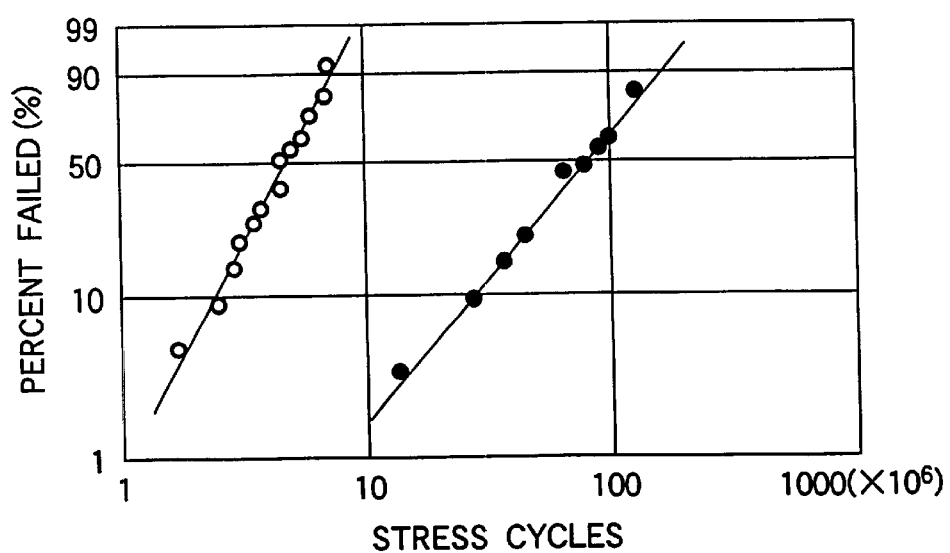
FIG. 4 shows a graph showing the experimented results as to the M50-made test pieces.
Figure 5:
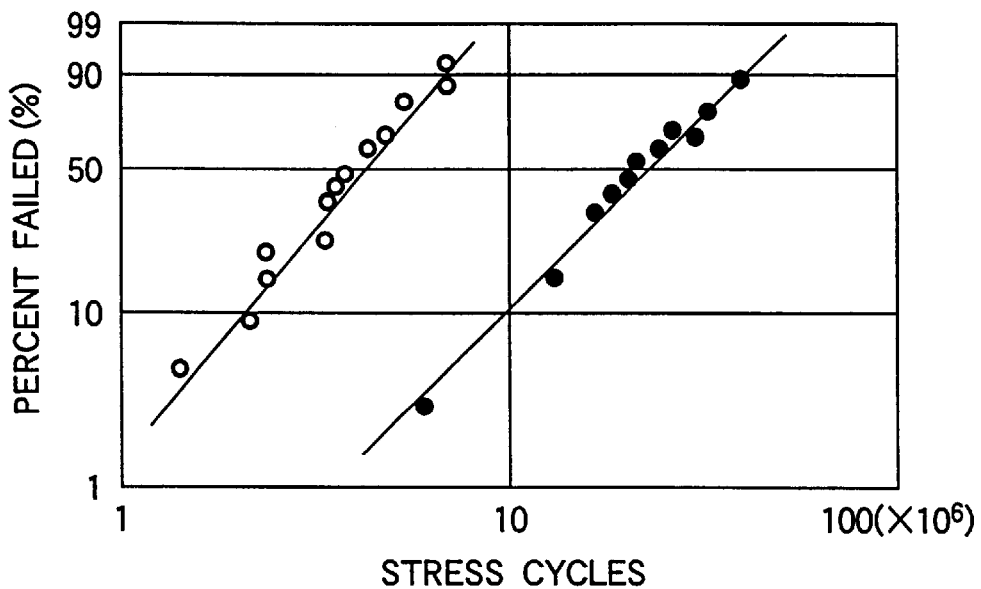
FIG. 5 shows a graph showing the experimented results as to the M50NiL-made test pieces.

In FIGS. 4 and 5 showing the experimented results, FIG. 4 shows the results as to the M50-made test pieces, and FIG. 5 shows the results as to the M50NiL-made test pieces. In each of them, ○ designates the results of those not practiced with the low temperature nitriding treatment, while ● designates the results of those practiced therewith. As seen from FIGS. 4 and 5, in the case of the test pieces of the low temperature nitriding treatment, the peeling resistibility is largely improved.

Figure 6:
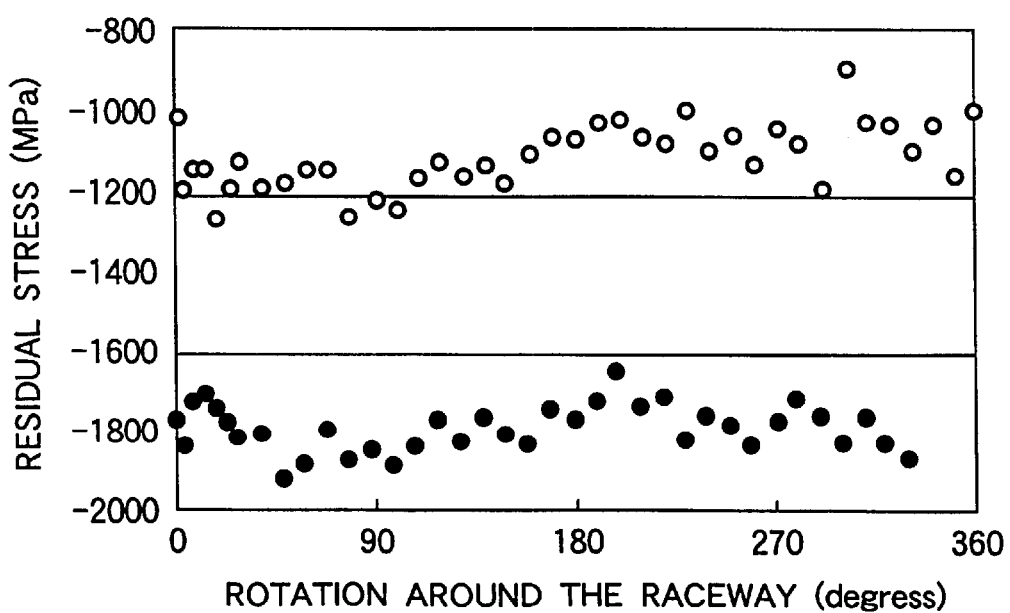
FIG. 6 shows a diagram showing distributions of the residual stress in the M50NiL-made test pieces.

FIG. 6 shows the results of measuring the residual stress in the surfaces of the test pieces. Also in FIG. 6, ○ designates the results of those not practiced with the low temperature nitriding treatment, while ● designates the results of those practiced therewith. From FIG. 6, it is assumed that in the case of the test pieces of the low temperature nitriding treatment, the residual compressive stress is largely improved, and this fact contributes to the large improvement of the peeling resistibility.

The experiments were carried out with the test pieces made of M50 and M50NiL, and in the case of the test pieces made of the stainless steel, similar differences arise in those practiced with the low temperature nitriding treatment and those not practiced therewith. Accordingly, if the low temperature niriding treatment is performed on the inner rings and the outer rings made of the stainless steels, the excellent abrasion resistibility can be provided in addition to the excellent corrosion resistibility.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

Being composed and worked as mentioned above, the rolling bearing of the invention can contribute to improvements of the endurance in the rotation supporters of jet engines for aircraft or gear boxes.

What is claimed is:

1. A rolling bearing comprising:
    an inner ring made of iron based alloy and having an inner ring raceway in an outer circumferential surface thereof;
    an outer ring made of iron based alloy and having an outer ring raceway in an inner circumferential surface thereof;
    a plurality of rolling elements rotatably disposed between the inner ring raceway and the outer ring raceway; and
    a retainer having the inner circumferential surface and the outer circumferential surface and rotatably holding each of said rolling elements,
    wherein either of the inner and outer circumferential surfaces of said retainer is guided by a guiding part which is formed on either of the outer circumferential surface of the inner ring and the inner circumferential surface of the outer ring, to thereby prevent the retainer from displacing in radial direction of said retainer,
    wherein said guiding part has a fine nitride layer comprising a compound layer and a diffusion hardened layer and having hardness of Hv900 or higher, and
    wherein said fine nitride layer is formed by a low-temperature nitriding treatment at 300 to 400° C.

2. The rolling bearing according to claim 1, wherein the rolling elements are made of ceramic.

3. A rolling bearing adapted to rotation supporters of jet engines for aircraft or gear boxes, comprising:
    an inner ring made of iron based alloy and having an inner ring raceway in an outer circumferential surface thereof;
    an outer ring made of iron based alloy and having an outer ring raceway in an inner circumferential surface thereof;
    a plurality of rolling elements rotatably disposed between the inner ring raceway and the outer ring raceway; and
    a retainer having the inner circumferential surface and the outer circumferential surface and rotatably holding each of said rolling elements,
    wherein either of the inner and outer circumferential surfaces of said retainer is guided by a guiding part which is formed on either of the outer circumferential surface of the inner ring and the inner circumferential surface of the outer ring, thereby to prevent the retainer from displacing in radial direction of said retainer,
    wherein said guiding part has a fine nitride layer comprising a compound layer and a diffusion hardened layer and having hardness of Hv900 or higher, and
    wherein said fine nitride layer is formed by a low-temperature nitriding treatment at 300 to 400° C.

4. The rolling bearing according to claim 3, wherein the rolling elements are made of ceramic.

5. The rolling bearing according to claim 3, wherein the rolling bearing is a ball bearing of single row deep groove type with four point-contact points.

6. The rolling bearing according to claim 3, wherein the rolling bearing is an angular ball bearing of counter bore type.

7. The rolling bearing according to claim 3, wherein the rolling bearing is a cylindrical roller bearing.

8. The rolling bearing according to claim 3, wherein the outer circumferential surfaces of said retainer is guided by said guiding part which is formed on the inner circumferential surface of the outer ring, to thereby prevent displacement in radial direction.

9. A method of making a rolling bearing adapted to rotation supporters of jet engines for aircraft or gear boxes, said rolling bearing comprising, an inner ring made of iron based alloy and having an inner ring raceway in an outer circumferential surface thereof;

an outer ring made of iron based alloy and having an outer ring raceway in an inner circumferential surface thereof;

a plurality of rolling elements rotatably disposed between the inner ring raceway and the outer ring raceway; and a retainer having the inner circumferential surface and the outer circumferential surface and rotatably holding each of said rolling elements, wherein either of the inner and outer circumferential surfaces of said retainer is guided by a guiding part which is formed on either of the outer circumferential surface of the inner ring and the inner circumferential surface of the outer ring, thereby to prevent the retainer from displacing in radial direction of said retainer, and wherein said guiding part has a fine nitride layer comprising a compound layer and a diffusion hardened layer and having hardness of Hv900 or higher, said method comprising the steps of:

performing a low temperature nitriding treatment at 300 to 400° C. for forming nitride layer on surfaces of the inner ring and the outer ring composing the rolling bearing.

* * * * *